United States Patent
Ikeda

(10) Patent No.: US 10,791,242 B2
(45) Date of Patent: Sep. 29, 2020

(54) TERMINAL APPARATUS, WIRELESS CONNECTION CONTROL METHOD, AND STORAGE MEDIUM STORING WIRELESS CONNECTION CONTROL PROGRAM

(71) Applicant: SEIKO EPSON CORPORATION, Tokyo (JP)

(72) Inventor: Iwane Ikeda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/684,768

(22) Filed: Nov. 15, 2019

(65) Prior Publication Data

US 2020/0162633 A1    May 21, 2020

(30) Foreign Application Priority Data

Nov. 16, 2018  (JP) ................ 2018-215266

(51) Int. Cl.
| | |
|---|---|
| *G06F 3/12* | (2006.01) |
| *H04N 1/327* | (2006.01) |
| *H04W 8/00* | (2009.01) |
| *H04W 48/16* | (2009.01) |
| *H04N 1/00* | (2006.01) |

(52) U.S. Cl.
CPC ....... *H04N 1/32776* (2013.01); *G06F 3/1204* (2013.01); *G06F 3/1236* (2013.01); *H04N 1/00395* (2013.01); *H04W 8/005* (2013.01); *H04W 48/16* (2013.01); *G06F 3/1292* (2013.01)

(58) Field of Classification Search
CPC ........... H04N 1/32776; H04N 1/00395; H04N 2201/0034; H04N 2201/0036; H04N 2201/0039; H04W 48/16; H04W 8/005; H04W 48/20; H04W 88/06; G06F 3/1236; G06F 3/1204; G06F 3/1292
See application file for complete search history.

(56) References Cited

U.S. PATENT DOCUMENTS

| | | | |
|---|---|---|---|
| 2010/0067406 A1 | 3/2010 | Suzuki | |
| 2010/0165879 A1* | 7/2010 | Gupta | ................. H04L 12/2807 370/254 |
| 2015/0186082 A1* | 7/2015 | Lee | ....................... G06F 3/1236 358/1.15 |

FOREIGN PATENT DOCUMENTS

JP    2011-188518    9/2011

* cited by examiner

*Primary Examiner* — Kent Yip
(74) *Attorney, Agent, or Firm* — Workman Nydegger

(57) ABSTRACT

A terminal apparatus includes a first wireless communication unit, a second wireless communication unit, and a controller. The first wireless communication unit conducts first wireless communication with a device under a first wireless communication scheme. The second wireless communication unit conducts second wireless communication via an access point. The controller causes a predetermined display unit to display a list of access points which the first wireless communication unit receives from the device. The device acquires the list by searching for the access points. The controller connects the device to an access point selected from the list under a second wireless communication scheme. The controller designates the access point selected from the list as an access point to which the second wireless communication unit is to connect, and causes the second wireless communication unit to search for the device via the access point selected from the list.

5 Claims, 7 Drawing Sheets

TERMINAL APPARATUS, WIRELESS CONNECTION CONTROL METHOD, AND STORAGE MEDIUM STORING WIRELESS CONNECTION CONTROL PROGRAM

The present application is based on, and claims priority from JP Application Serial Number 2018-215266, filed Nov. 16, 2018, the disclosure of which is hereby incorporated by reference herein in its entirety.

BACKGROUND

1. Technical Field

The present disclosure relates to a terminal apparatus, a wireless connection control method, and a storage medium storing a wireless connection control program.

2. Related Art

JP-A-2011-188518 discloses a technique associated with the wireless connection between a multi-function printer (MFP) and an access point that acts as a relay on a wireless local area network (LAN). The MFP has a display unit that displays the service set identifiers (SSIDs) of access points to which the MFP is connectable. A user operates an operation unit to select one of the SSIDs, thereby determining to which access point the MFP is to connect.

To operate a device such as an MFP via a smartphone, tablet terminal, or other terminal apparatus over a wireless LAN, a user needs to connect the device to an access point.

SUMMARY

Even when the device connects to the access point selected by the user, the terminal apparatus may fail to detect the presence of the device via the access point to which this terminal apparatus is connected. In which case, the user may be unable to use the terminal apparatus to operate the device over the wireless LAN. Therefore, there is a demand for a terminal apparatus to be able to verify the connection to a device via an access point.

A terminal apparatus includes a first wireless communication unit, a second wireless communication unit, and a controller. The first wireless communication unit conducts first wireless communication with a device under a first wireless communication scheme. The second wireless communication unit conducts second wireless communication via an access point that supports a second wireless communication scheme. The controller causes a predetermined display unit to display an access point list that the first wireless communication unit receives from the device. The device acquires the access point list by searching for access points that support the second wireless communication scheme. The controller connects the device to an access point selected from the access point list under the second wireless communication scheme. The controller designates the access point selected from the access point list as an access point to which the second wireless communication unit is to connect and causes the second wireless communication unit to search for the device via the access point selected from the access point list.

DESCRIPTION OF EXEMPLARY EMBODIMENTS

Some embodiments of the present disclosure will be described below with reference to the accompanying drawings. It should be noted that such embodiments are examples.

1. Schematic Configuration of System

Figure 1:
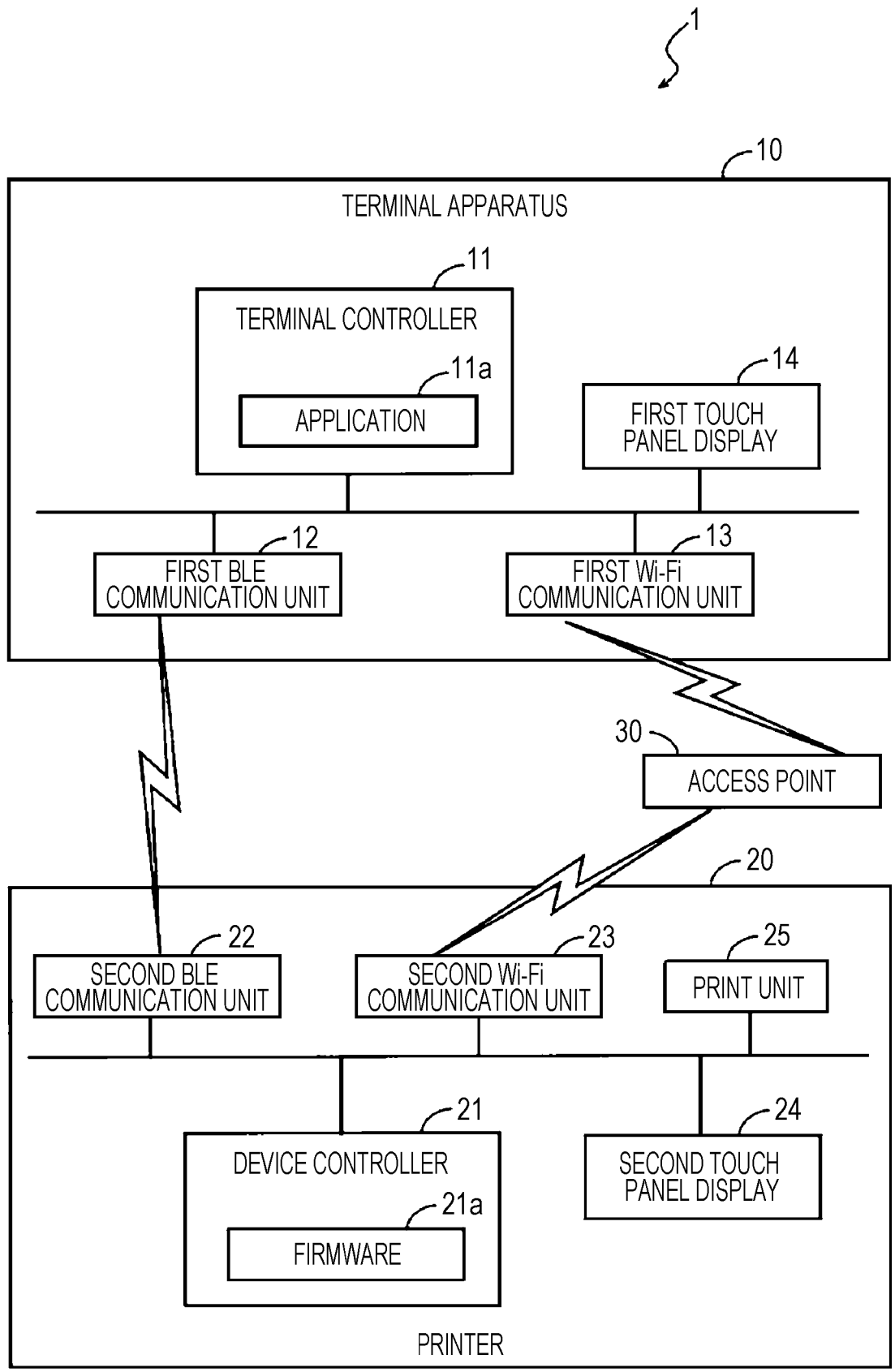
FIG. 1 illustrates a schematic configuration of a system according to an embodiment of the present disclosure.

FIG. 1 illustrates a schematic configuration of a system 1 according to an embodiment of the present disclosure. The system 1 includes a terminal apparatus 10 and a printer 20. Herein, the printer 20 is an example of a device. The terminal apparatus 10 and the printer 20 conduct first wireless communication with each other under a wireless communication scheme conforming to a Bluetooth (registered trademark) low energy (BLE) specification. In this embodiment, the wireless communication scheme conforming to the BLE specification corresponds to a first wireless communication scheme.

The terminal apparatus 10 conducts second wireless communication with an access point 30 over a wireless local area network (LAN) under a wireless communication scheme conforming to a Wi-Fi (registered trademark) specification, which is one of wireless LAN specifications. The printer 20 also conducts the second wireless communication with the access point 30 over the LAN under the wireless communication scheme conforming to the Wi-Fi specification. In this embodiment, the wireless communication scheme conforming to the Wi-Fi specification corresponds to a second wireless communication scheme.

The access point 30 functions as a wireless LAN router. Although a single access point 30 is illustrated in FIG. 1, one or more access points 30 may be further present around the terminal apparatus 10 and the printer 20. Likewise, one or more printers 20 may be further present.

The terminal apparatus 10 includes a terminal controller 11, a first BLE communication unit 12, a first Wi-Fi communication unit 13, and a first touch panel display 14. Under the BLE specification, the first BLE communication unit 12 can conduct the wireless communication with a communication partner at power lower than that of the first Wi-Fi communication unit 13, but its maximum communication distance is shorter. As an example, the first BLE communication unit 12 may be a chip or a module that conducts the wireless communication in conformity with the BLE specification. Herein, the first BLE communication unit 12 corresponds to a first wireless communication unit in a terminal apparatus.

The first Wi-Fi communication unit 13 conducts the wireless communication with a communication partner in conformity with the Wi-Fi specification. As an example, the first Wi-Fi communication unit 13 may be a chip or a module that conducts the wireless communication in conformity with the Wi-Fi specification. Herein, the first Wi-Fi communication unit 13 corresponds to a second wireless communication unit in the terminal apparatus.

The first touch panel display 14 serves as a user interface, abbreviated below as a UI, that includes: a display that displays various information; and a touch panel that detects a touch on the display. Herein, the first touch panel display 14 corresponds to a display unit and an operation unit in the terminal apparatus. The operation unit does not necessarily have to be a touch panel and alternatively may be a hardware component, such as buttons, a keyboard, or a mouse, that receives a user's input.

The terminal controller 11 includes: an unillustrated processor such as a central processing unit (CPU); and unillustrated memory such as read only memory (ROM) or random access memory (RAM). The terminal controller 11 executes programs stored in the memory. As an example, the memory may be electrically erasable programmable read only memory (EEPROM). The processor in the terminal controller 11 does not necessarily have to be a single CPU and alternatively may be a plurality of CPUs, a hardware processing circuit such as an application specific integrated circuit, and the combination of a CPU and a hardware processing circuit. The terminal controller 11 executes an application 11a, which is one of the programs stored in the memory, to control the operations of the first BLE communication unit 12, the first Wi-Fi communication unit 13, and the first touch panel display 14. Herein, the application 11a corresponds to a wireless connection control program. For example, the terminal controller 11 causes the first touch panel display 14 to display an image and receives a user's input through the first touch panel display 14. Moreover, the terminal controller 11 causes the first BLE communication unit 12 to conduct the first wireless communication or causes the first Wi-Fi communication unit 13 to conduct the second wireless communication.

The terminal apparatus 10 may be a portable communication terminal apparatus, such as a smartphone, a tablet computer, or a laptop personal computer.

The printer 20 includes a device controller 21, a second BLE communication unit 22, a second Wi-Fi communication unit 23, a second touch panel display 24, and a print unit 25. Under the BLE specification, the second BLE communication unit 22 can conduct the wireless communication with a communication partner at power lower than that of the second Wi-Fi communication unit 23, but its maximum communication distance is shorter. As an example, the second BLE communication unit 22 may be a chip or a module that conducts the wireless communication in conformity with the BLE specification.

The second Wi-Fi communication unit 23 conducts the wireless communication with a communication partner in conformity with the Wi-Fi specification. As an example, the second Wi-Fi communication unit 23 may be a chip or a module that conducts the wireless communication in conformity with the Wi-Fi specification.

The second touch panel display 24, which serves as a UI, includes: a display that displays various information; and a touch panel that detects a touch on the display. The print unit 25 transports an unillustrated print medium and prints an image on the print medium.

The device controller 21 includes: an unillustrated processor such as a CPU; and unillustrated memory such as ROM and RAM. The device controller 21 executes programs stored in the memory. The processor in the device controller 21 does not necessarily have to be a single CPU and alternatively may be a plurality of CPUs, a hardware processing circuit such as an application specific integrated circuit, and the combination of a CPU and a hardware processing circuit. The device controller 21 executes a firmware 21a, which is a program stored in the memory, to control the operations of the second BLE communication unit 22, the second Wi-Fi communication unit 23, the second touch panel display 24, and the print unit 25. For example, the device controller 21 causes the second touch panel display 24 to display an image and receives a user's input through the second touch panel display 24. The device controller 21 performs an imaging process on an image based on print data and causes the print unit 25 to print the image on a print medium. The device controller 21 causes the second BLE communication unit 22 to conduct the first wireless communication or causes the second Wi-Fi communication unit 23 to conduct the second wireless communication.

The printer 20 may be an MFP that incorporates: the print function of the print unit 25; the reading function of a scanner; the communication function of a facsimile communication unit; and others.

2. Wireless Connection Control Process

Next, a description will be given of a process in which the system 1 controls the wireless connection. In this case, a user attempts to operate the terminal apparatus 10 to connect the printer 20 to wireless LAN. The terminal apparatus 10 has already conducted the second wireless communication with the access point 30. In other words, the terminal apparatus 10 is already connected to the wireless LAN on which the access point 30 relays data.

Figure 2:
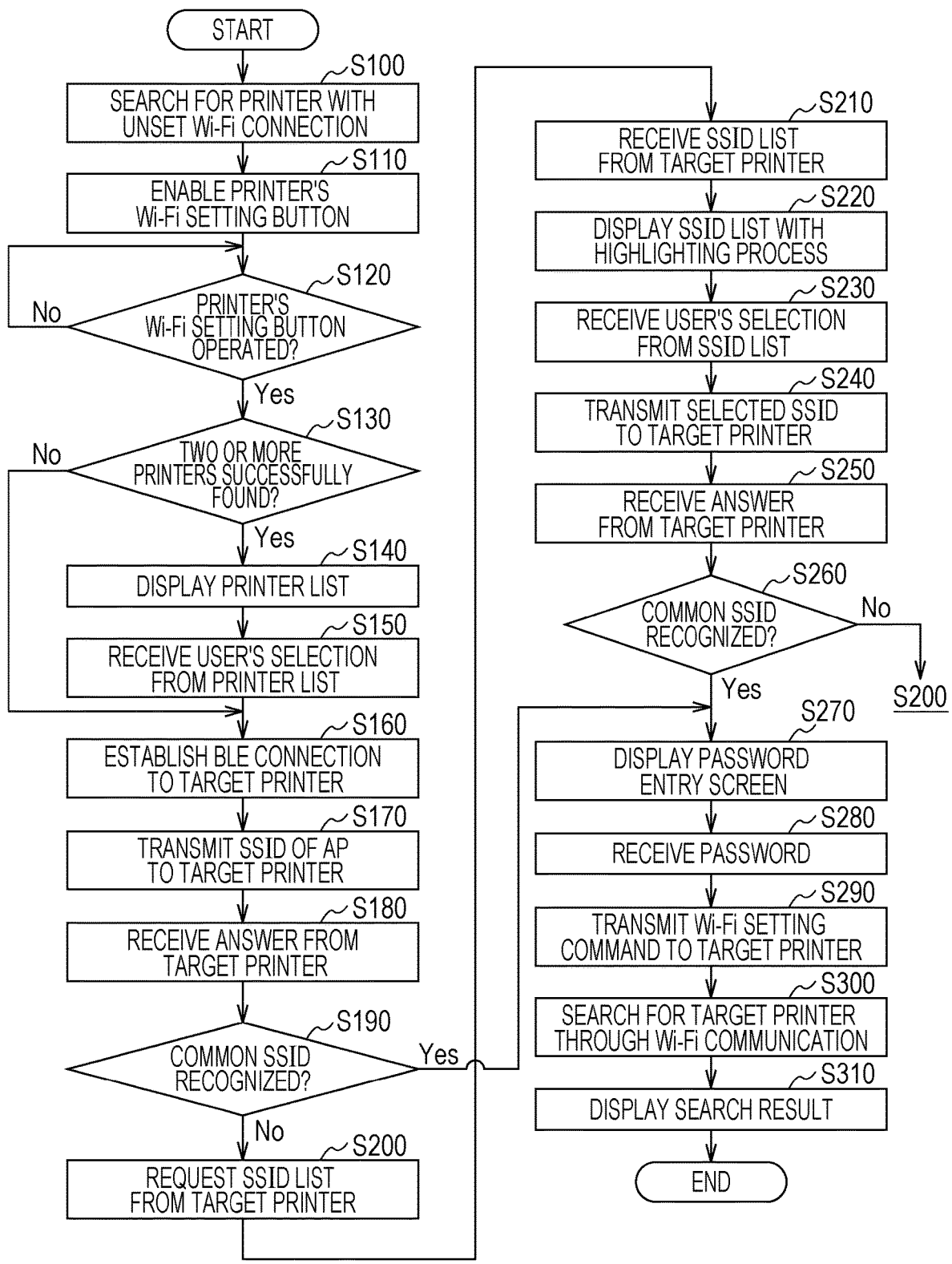
FIG. 2 is a flowchart of a process in which the terminal apparatus controls a wireless connection.
Figure 3:
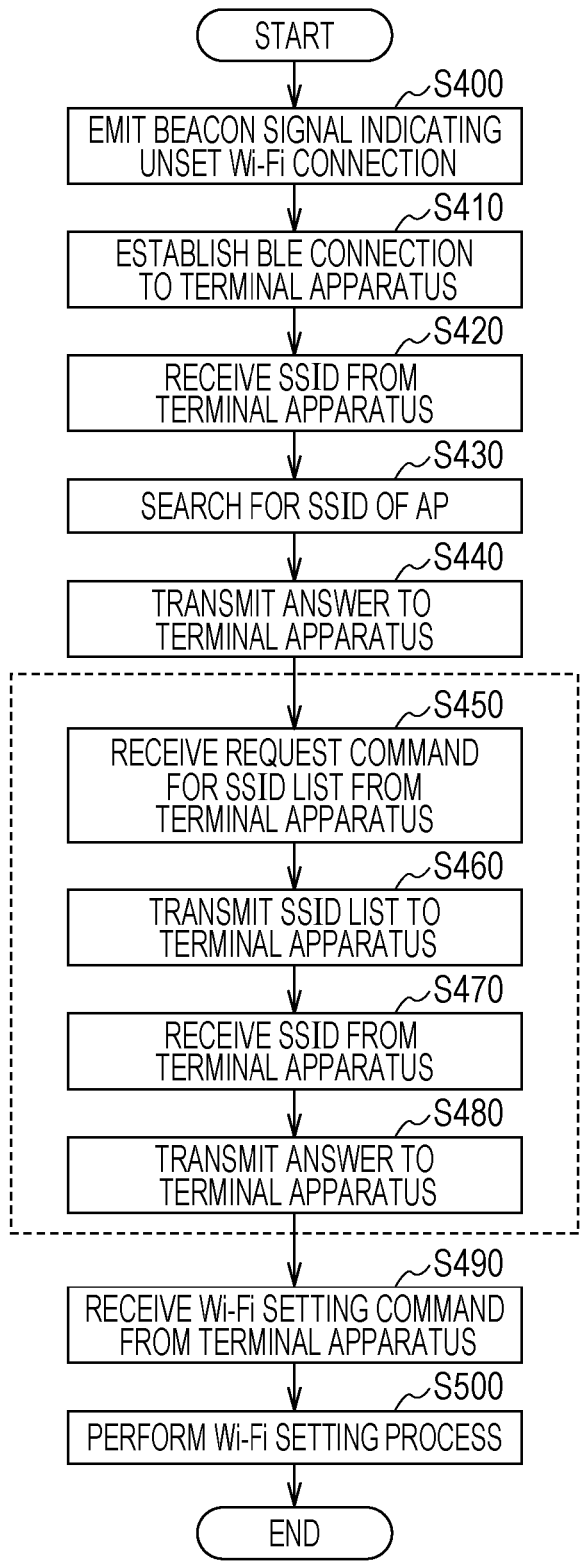
FIG. 3 is a flowchart of a process in which the printer controls a wireless connection.

FIG. 2 is a flowchart of a process in which the terminal controller 11 in the terminal apparatus 10 controls the wireless connection in conformity with the application 11a. Herein, at least some of the steps in FIG. 2 correspond to steps of a wireless connection control method. FIG. 3 is a flowchart of a process in which the device controller 21 in the printer 20 controls the wireless connection in conformity with the firmware 21a.

When the printer 20 is not connected to the wireless LAN, in other words, when the Wi-Fi connection of the printer 20 is not set, the device controller 21 causes the second BLE communication unit 22 to emit a Beacon signal conforming to the BLE specification to nifty that the Wi-Fi connection is not set, as at Step S400. This Beacon signal is referred to as the advertising packet. Hereinafter, the Beacon signal that the second BLE communication unit 22 emits at Step S400 is also referred to as the BLE Beacon signal. The second BLE communication unit 22 may emit the BLE Beacon signal at predetermined time intervals.

The BLE Beacon signal that the second BLE communication unit 22 emits at Step S400 contains various identification information and the device name of the printer 20. Examples of the identification information include: specific identification data (ID) that indicates that the printer 20 is a target device to which the terminal apparatus 10 subjects Wi-Fi setting control; an address uniquely assigned to the second BLE communication unit 22; and a media access control (MAC) address uniquely assigned to the second Wi-Fi communication unit 23. The identification information, the device name, and other information contained in the BLE Beacon signal are referred collectively to below as the BLE Beacon information.

The user of the terminal apparatus 10 operates the first touch panel display 14 to activate the application 11*a*. When activated, the application 11*a* causes the first touch panel display 14 to display a UI screen. When the user performs a predetermined operation through the UI screen, the application 11*a* instructs the terminal controller 11 in the terminal apparatus 10 to search for a printer 20 whose Wi-Fi connection is not set. This instruction triggers the terminal apparatus 10 to perform the process of the flowchart in FIG. 2.

At Step S100, the terminal controller 11 searches for a printer 20 nearby whose Wi-Fi connection is not set. In this case, the terminal controller 11 causes the first BLE communication unit 12 to sense the BLE Beacon signal.

If the first BLE communication unit 12 senses the BLE Beacon signal at Step S100, at Step S110, the terminal controller 11 causes the first touch panel display 14 to enable a printer's Wi-Fi setting button on the UI screen.

Figure 4A:
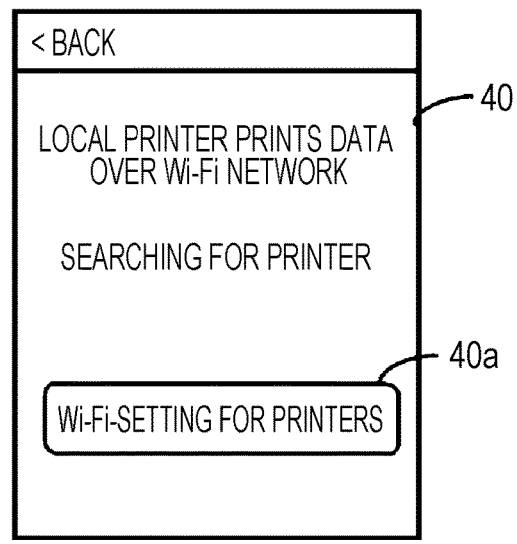
FIG. 4A illustrates a UI screen in the terminal apparatus.

FIGS. 4A to 5D each illustrate an example of the UI screen that the terminal controller 11 causes the first touch panel display 14 to display in conformity with the application 11*a*. The reference numerals 40, 41, 42, 43, 44, 45, and 46 in FIGS. 4 and 5 denote respective UI screens. At Step S110, the terminal controller 11 enables a printer's Wi-Fi setting button 40*a* on the UI screen 40, as illustrated in FIG. 4A. If the terminal apparatus 10 does not sense the BLE Beacon signal at Step S100, the terminal controller 11 may repeat the process at Step S100 or terminate the process of the flowchart in FIG. 2. In this embodiment, the description will be given below regarding a case where the terminal apparatus 10 senses the BLE Beacon signals from one or more printers 20.

At Step S120, the terminal controller 11 determines whether the user operates the printer's Wi-Fi setting button 40*a*, for example, by tapping or clicking it. If the user operates the printer's Wi-Fi setting button 40*a*, the terminal controller 11 selects "Yes" and proceeds to the process at Step S130.

At Step S130, the terminal controller 11 determines whether the terminal apparatus 10 has successfully found a plurality of printers 20 whose Wi-Fi connections are not set. If the terminal apparatus 10 senses the BLE Beacon signals from a plurality of printers 20 at Step S100, the terminal controller 11 selects "Yes" and proceeds to the process at Step S140. If the terminal apparatus 10 senses the BLE Beacon signal from a single printer 20 at Step S100, the terminal controller 11 selects "No" and proceeds to the process at Step S160.

Figure 4B:
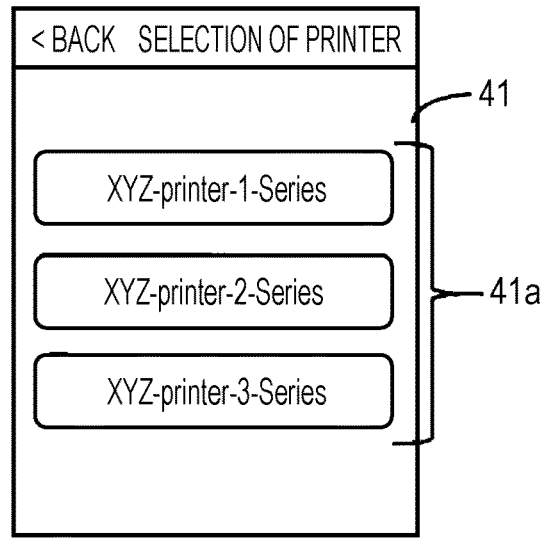
FIG. 4B illustrates a UI screen in the terminal apparatus.

At Step S140, the terminal controller 11 causes the first touch panel display 14 to display the list of the printers 20 found at S100. In this case, as illustrated in FIG. 4B, the first touch panel display 14 displays a UI screen 41 that contains a printer list 41*a* displayed at Step S140; the printer list 41*a* contains the machine or device names of the printers 20. The device names in the printer list 41*a* are extracted from the BLE Beacon information contained in the BLE Beacon signals from the printers 20 found at Step S100. In this case, the printer list 41*a* on the UI screen 41 contains three printers 20 whose Wi-Fi connections are not set.

The terminal controller 11 may create the printer list 41*a* on the UI screen 41 in such a way that the printers 20 positioned closer to the terminal apparatus 10 are listed toward the top. By creating the printer list 41*a* in this manner, the user is more likely to select a printer 20 positioned closer to the terminal apparatus 10. To determine the distance between the terminal apparatus 10 and each printer 20, the terminal controller 11 may employ any given method. As an example, the terminal controller 11 may estimate the distance between the terminal apparatus 10 and a printer 20 by comparing between the received signal strength indication (RSSI) of the BLE Beacon signal that has been received from the printer 20 at Step S100 and a predetermined threshold. The terminal controller 11 may cause the first touch panel display 14 to further display icons adjacent to the device names in the printer list 41*a*; the icons indicate the RSSIs of the BLE Beacon signals. Displaying the icons in this manner can persuade the user to select the printer 20 positioned closest to the terminal apparatus 10.

At Step S150, the terminal controller 11 receives a user's selection from the list of the printers 20 displayed at Step S140. In this case, the user may select one of the device names in the printer list 41*a* on the UI screen 41 through the first touch panel display 14. Hereinafter, the printer 20 selected by the user at Step S150 is referred to as the "target printer 20". If having selected "No" at Step S130, the terminal controller 11 designates the printer 20 found at Step S100 as the target printer 20.

At Steps S160 and S410, both the terminal apparatus 10 and the target printer 20 establish the connection, referred to below as the BLE connection, therebetween in order to conduct the first wireless communication. In this case, the terminal controller 11 causes the first BLE communication unit 12 to transmit a predetermined connection request to the second BLE communication unit 22 in the target printer 20 under the BLE specification. In response to this connection request, the device controller 21 in the target printer 20 causes the second BLE communication unit 22 to transmit the answer to the first BLE communication unit 12. As a result of the interaction between the terminal apparatus 10 and the target printer 20 under the BLE specification, the BLE connection is established.

In this embodiment, the terminal controller 11 extracts the identification information from the BLE Beacon information contained in the BLE Beacon signal transmitted from the target printer 20 and converts the identification information by using a predetermined equation. Then, the terminal controller 11 adds the converted identification information to a BLE connection request and causes the first BLE communication unit 12 to transmit the BLE connection request to the second BLE communication unit 22 in the target printer 20. When the target printer 20 receives the BLE connection request, the device controller 21 extracts the identification information from the BLE connection request and determines whether the extracted identification information is proper. More specifically, the device controller 21 uses the equation to convert the identification information that has been added to the BLE Beacon information contained in the BLE Beacon signal that the second BLE communication unit 22 has transmitted. Then, if this converted identification information matches the identification information contained in the BLE connection request, the device controller 21 can determine that the extracted identification information is proper. When determining that the extracted identification information is proper, the device controller 21 transmits the answer to the terminal controller 11 in the terminal apparatus 10 in response to the connection request. In this way, the BLE connection is established between the terminal apparatus 10 and the target printer 20.

After the establishment of the BLE connection, the second BLE communication unit 22 in the target printer 20 stops emitting the BLE Beacon signal.

At Step S170, the terminal controller 11 causes the first BLE communication unit 12 to transmit, to the second BLE communication unit 22 in the target printer 20, the service set identifier (SSID) of the access point 30 to which the first Wi-Fi communication unit 13 is connected. The SSID is a network identifier of the access point 30. In FIGS. 2 and 3, the access point is abbreviated as the AP. The SSID of the access point 30 to which the first Wi-Fi communication unit 13 is connected corresponds to the SSID which the first Wi-Fi communication unit 13 is currently using to conduct the second wireless communication with the access point 30. Herein, the access point 30 to which the first Wi-Fi communication unit 13 is connected corresponds to the "first access point". In addition, the SSID that the terminal controller 11 has transmitted to the device controller 21 in the target printer 20 at Step S170, or the SSID of the first access point, is referred to below as the "first SSID".

At Step S420, the device controller 21 in the target printer 20 receives the first SSID from the terminal apparatus 10 via the second BLE communication unit 22. It should be noted that the communication conducted between the terminal apparatus 10 and the target printer 20 at Steps S170, S180, S200, S210, S240, S250, and S290 in FIG. 2 and at Steps S420 and S440 to S490 in FIG. 3 corresponds to the first wireless communication conducted between the first BLE communication unit 12 and the second BLE communication unit 22 via the BLE connection.

At Step S430, the device controller 21 searches for the SSIDs of access points 30 present nearby. Every access point 30 emits a Beacon signal in a format defined in the Wi-Fi specification at preset time intervals; this Beacon signal contains its SSID and security type. The Beacon signal emitted from an access point 30 is referred to below as the Wi-Fi Beacon signal. The device controller 21 causes the second Wi-Fi communication unit 23 to sense the Wi-Fi Beacon signal. The timing of performing the process at Step S430 corresponds to one timing of searching for the SSID of an access point 30 present around a printer 20 whose Wi-Fi connection is not set.

At Step S440, in response to the first SSID received at Step S420, the device controller 21 transmits the answer to the terminal controller 11 in the terminal apparatus 10. The answer transmitted at Step S440 directly or indirectly indicates whether the printer 20 has recognized the first SSID received at Step S420 as one of the SSIDs of access points 30 present nearly.

More specifically, the device controller 21 extracts the SSID and a security type from the Wi-Fi Beacon signal sensed by the second Wi-Fi communication unit 23 when searching for the SSIDs at Step S430 or some other step. The security type may be an encryption scheme, such as the wired equivalent privacy (WEP), the temporal key integrity protocol (TKIP), the advanced encryption standard (AES), or a similar known scheme. If the SSID found at Step S430 or some other step matches the first SSID received at Step S420, the device controller 21 transmits the security type supported by the first SSID to the terminal apparatus 10 as the answer at Step S440. If the SSID that matches the first SSID received at Step S420 has not been found at Step S430 or some other step, the device controller 21 cannot recognize the security type supported by the first SSID. In this case, at Step S440, the device controller 21 transmits the answer that it has failed to recognize the security type supported by the first SSID to the terminal controller 11 in the terminal apparatus 10.

At Step S180, the terminal controller 11 in the terminal apparatus 10 receives the answer to the first SSID transmitted at Step S170 from the device controller 21 in the target printer 20. At Step S190, the terminal controller 11 determines whether both the terminal apparatus 10 and the target printer 20 recognize the common SSID, or the first SSID. When the answer received at Step S180 indicates that the device controller 21 has recognized the security type supported by the first SSID, the terminal controller 11 selects "Yes". In which case, the terminal controller 11 skips the process at Steps S200 to S260 and proceeds to the process at Step S270. When the answer received at Step S180 indicates that the device controller 21 has not recognized the security type supported by the first SSID, the terminal controller 11 selects "No" and proceeds to the process at Step S200.

Figure 4C:
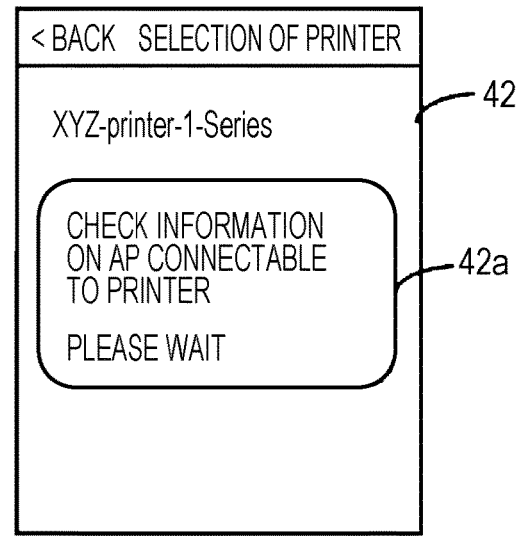
FIG. 4C illustrates a UI screen in the terminal apparatus.

FIG. 4C illustrates a UI screen 42 displayed when "No" is selected at Step S130 or after the user has selected a printer 20 in the printer list 41a on the UI screen 41 displayed at Step S140. The UI screen 42 contains a message 42a reading "search for an access point 30 to which the target printer 20 is connectable via Wi-Fi is being conducted". When the process at Step S270 is performed right after the process at Step S190, the terminal controller 11 keeps displaying the UI screen 42 until the process at Step S270 has been completed. When the process at Step S200 is performed right after the process at Step S190, the terminal controller 11 keeps displaying the UI screen 42 until the process at Step S220 has been completed.

At Step S200, the terminal controller 11 requests the SSID list of recognized access points 30 from the device controller 21 in the target printer 20. In this case, the terminal controller 11 transmits a request command for the SSID list to the device controller 21 in the target printer 20.

At Step S450, the device controller 21 in the target printer 20 receives the request for the SSID list, or the request command, from the terminal controller 11 in the terminal apparatus 10. It should be noted that the process at Steps S450 to S480 surrounded by the broken line in FIG. 3 which is performed by the target printer 20 is related to the process at Steps S200 to S260 performed by the terminal apparatus 10. When the terminal apparatus 10 performs the process at Step S270 right after the process at Step S190, the target printer 20 may skip the process at Steps S450 to S480.

At Step S460, the device controller 21 transmits the SSID list to the terminal controller 11 in the terminal apparatus 10. In this case, the device controller 21 generates data in a list format containing the SSIDs of the access points 30 that have been found until the timing of Step S460. Then, the device controller 21 transmits the data to the terminal controller 11 in the terminal apparatus 10 as the SSID list.

Figure 5A:
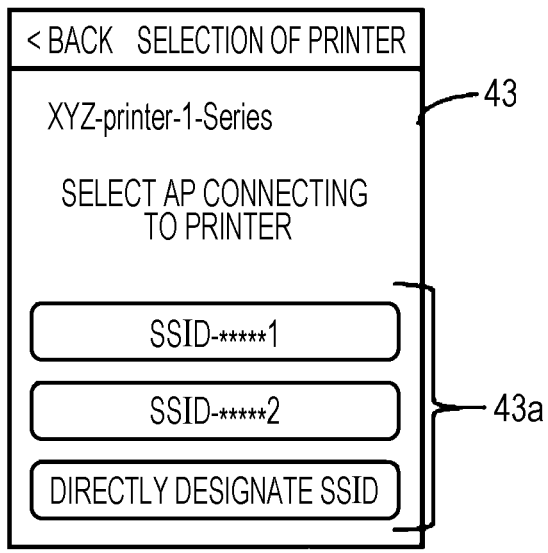
FIG. 5A illustrates a UI screen in the terminal apparatus.

At Step S210, the terminal controller 11 in the terminal apparatus 10 receives the SSID list from the device controller 21 in the target printer 20. At Step S220, the terminal controller 11 causes the first touch panel display 14 to display the SSID list received at Step S210. FIG. 5A illustrates a UI screen 43, which is an example of the UI screen displayed at Step S220; the UI screen 43 contains an SSID list 43a.

When displaying the SSID list at Step S220, the terminal controller 11 may perform a highlighting process. With the highlighting process, an SSID in the SSID list which has a specific relationship with the first SSID is distinguished from the others. This SSID is referred to below as a "second SSID". More specifically, the second SSID may be displayed on the top of the SSID list.

There are cases where a single access point 30 possesses a plurality of SSIDs. In this embodiment, a plurality of SSIDs possessed by a single access point 30 are defined as having a specific relationship with each other. The access point 30 possesses both the first SSID and the second SSID, and the first Wi-Fi communication unit 13 is connected to the access point 30 based on the first SSID. In this case, if the SSID list received at Step S210 contains the second SSID, at Step S220, the terminal controller 11 causes the first touch panel display 14 to display the SSID list with the second SSID highlighted.

More specifically, a single access point 30 possess two SSIDs: one is used to identify a wireless LAN supporting a frequency band of 5.0 GHz; and the other is used to identify a wireless LAN supporting a frequency band of 2.4 GHz. In this cases, a plurality of SSIDs possessed by a single access point 30 which support different frequency bands usually have similar letter strings. If the letter string of a certain SSID in the SSID list differs from that of the first SSID but this difference is due to their frequency bands, the terminal controller 11 designates this SSID as the second SSID and causes the first touch panel display 14 to display the SSID list with the second SSID highlighted.

As an example, the first Wi-Fi communication unit 13 in the terminal apparatus 10 is connected to the access point 30 based on the first SSID supporting the frequency band of 5 GHz, and the access point 30 has another SSID supporting the frequency band of 2.4 GHz. Furthermore, the second Wi-Fi communication unit 23 in the target printer 20 has searched for the SSID supporting the frequency band of 2.4 GHz at Step S430 or some other step. In this case, the SSID list generated by the device controller 21 in the target printer 20 may contain the second SSID having a specific relationship with the first SSID. If an SSID contained in the SSID list satisfies at least one of conditions 1 to 4 described below, for example, the terminal controller 11 designates this SSID as the second SSID.

[Condition 1]

When the last letter "-a" in the letter string of an SSID is replaced with the letter "-g" or when the last letter "_A" in the letter string of the SSID is replaced with the letter "_G", if the replaced letter string matches the letter string of the first SSID, this SSID can be designated as the second SSID.

[Condition 2]

When the middle letter "-a-" in the letter string of an SSID is replaced with the letter "-g-" or when the middle letter "-A_" in the letter string of the SSID is replaced with the letter "-G_", if the replaced letter string matches the letter string of the first SSID, this SSID can be designated as the second SSID.

[Condition 3]

When the middle letter "2G" in the letter string of an SSID is replaced with the letter "5G", if the replaced letter string matches the letter string of the first SSID, this SSID can be designated as the second SSID.

[Condition 4]

When the last letter "-5G" in the letter string of an SSID is deleted, if this letter string matches the letter string of the first SSID, this SSID can be designated as the second SSID.

As described above, if the letter string of the first SSID matches the letter string of an SSID in the SSID list except letters indicating respective supported frequency bands, the terminal controller 11 designates the SSID in the SSID list as the second SSID. Examples of letters indicating supported frequency bands include "-a", "_A", "-g", "_G", "-a-", "-A _", "-g-", "-G_", "2G", "5G", and "-5G". However, a method for identifying the second SSID from the SSID list does not necessarily have to satisfy the conditions 1 to 4.

In FIG. 5A, the UI screen 43 contains a plurality of SSIDs, including "SSID-***1" and "SSID-*2", in the SSID list 43a. Among these, "SSID-*1" is listed on the top. Therefore, "SSID-***1" can be designated as an example of the second SSID having a specific relationship with the first SSID.

In the above highlighting process, the terminal controller 11 does not necessarily have to describe the second SSID on the top of the SSID list as described above. For example, the terminal controller 11 may display the second SSID with a larger font size than that of any other SSID or with a different font color.

At Step S230, the terminal controller 11 receives a user's selection from the SSID list that has been displayed at Step S220. In this case, the user selects one of the SSIDs in the SSID list 43a on the UI screen 43 through the first touch panel display 14. Hereinafter, the SSID that the terminal controller 11 has received as the selection at Step S230 is referred to as the "selected SSID". In this case, the user is highly likely to select the second SSID highlighted in the above manner in the SSID list 43a. Optionally, the terminal controller 11 may cause the first touch panel display 14 to display an entry field or a button on the UI screen 43 through which the user directly inputs the letter string of the selected SSID.

The process at Steps S240 to S260 in FIG. 2 is similar to the process at Steps S170 to S190. In which case, the first SSID used at Steps S170 to S190 should be read as the selected SSID at Steps S240 to S260. Likewise, the process at Steps S470 and S480 in FIG. 3 is similar to the process at Steps S420 and S440. In which case, the first SSID at Steps S420 and S440 should be read as the selected SSID at Steps S470 and S480. At Step S240, the terminal controller 11 transmits the selected SSID to the device controller 21 in the target printer 20. At Step S470, the device controller 21 receives the selected SSID from the terminal controller 11 in the terminal apparatus 10. In response to the selected SSID received at Step S470, at Step S480, the device controller 21 transmits the answer to the terminal apparatus 10. The answer transmitted at Step S480 directly or indirectly indicates whether the target printer 20 has recognized the selected SSID received at Step S470 as one of SSIDs of access points 30 present nearby.

If the selected SSID received at Step S470 matches one of the recognized SSIDs, the device controller 21 transmits, as the answer, the security type supported by the selected SSID to the terminal controller 11 in the terminal apparatus 10 at Step S480. If the selected SSID received at Step S470 does not match any of the recognized SSIDs, the device controller 21 fails to recognize the security type supported by the selected SSID. In this case, at Step S480, the device controller 21 transmits the answer that it fails to recognize the security type supported by the selected SSID to the terminal controller 11 in the terminal apparatus 10.

At Step S250, the terminal controller 11 in the terminal apparatus 10 receives the answer from the device controller 21 in the target printer 20 which responds to the selected SSID that has been transmitted to the target printer 20 at Step S240. At Step S260, the terminal controller 11 determines whether both the terminal apparatus 10 and the target printer 20 recognize the common SSID, or the selected SSID. When the answer received at Step S250 indicates the security type supported by the selected SSID, the terminal controller 11 selects "Yes" and proceeds to the process at Step S270. When the answer received at Step S250 does not indicate the security type supported by the selected SSID, the terminal controller 11 selects "No" and returns to the process at Step S200.

As can be understood from the above description, the selected SSID is an SSID that has been selected by the user from the SSID list generated by the target printer 20. Therefore, the terminal controller 11 selects "Yes" at Step S260 and proceeds to the process at Step S270. Optionally, the terminal controller 11 may skip the process at Steps S240 to S260 in the flowchart of FIG. 2, and the device controller 21 may skip the process at Steps S470 and S480 in the flowchart of FIG. 3.

Figure 5B:
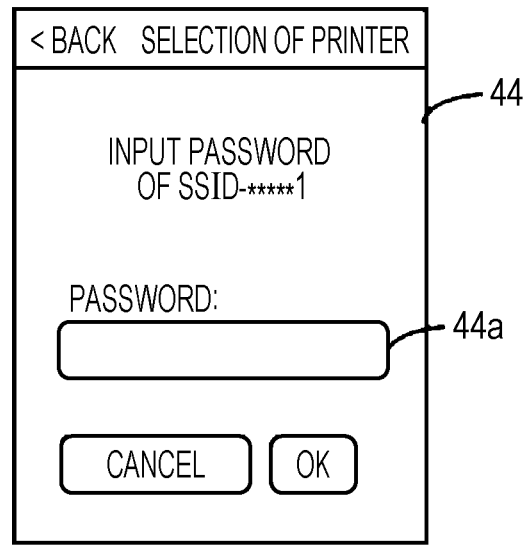
FIG. 5B illustrates a UI screen in the terminal apparatus.

At Step S270, the terminal controller 11 causes the first touch panel display 14 to display an entry screen through which the user inputs setting information required to conduct the second wireless communication with the target printer 20. The setting information may be a password for use in connecting to the access point 30. FIG. 5B illustrates a UI screen 44, which is the UI screen displayed at Step S270. The user can input the password through a password entry field 44a on the UI screen 44. The terminal controller 11 causes the first touch panel display 14 to display the selected SSID and the password entry field 44a together on the UI screen 44. Displaying them in this manner can encourage the user to input the password required to connect to the access point 30 supported by the selected SSID. If proceeding to the Step S270 right after the process at Step S190, the terminal controller 11 displays the first SSID and the password entry field 44a together on the UI screen 44.

At Step S280, the terminal controller 11 receives the input of the password, as the setting information, through the entry screen that has been displayed at Step S270. In this case, the user inputs the password in the password entry field 44a on the UI screen 44. It should be noted that the password required to connect to the access point 30 may be read from a label, for example, attached on the bottom of the housing of the access point 30. The description will be given regarding a case where the user has already known the password.

At Step S290, the terminal controller 11 generates a Wi-Fi setting command containing the SSID and the password required to connect to the access point 30 and transmits the generated Wi-Fi setting command to the target printer 20. The Wi-Fi setting command is used to instruct the target printer 20 to connect to the access point 30, namely, set the Wi-Fi connection. In response to the transmission of the Wi-Fi setting command to the target printer 20, the target printer 20 connects to the access point 30 selected from the SSID list under the second wireless communication scheme. In the Wi-Fi setting command, the SSID corresponds to the selected SSID, and the password corresponds to the password that has been received at Step S280. If having proceeded to Step S270 right after the process at Step S190, the terminal controller 11 adds the first SSID and the password received at Step S280 to the Wi-Fi setting command.

At Step S490, the device controller 21 in the target printer 20 receives the Wi-Fi setting command from the terminal controller 11 in the terminal apparatus 10. At Step S500, the device controller 21 performs a Wi-Fi setting process, based on the Wi-Fi setting command that has been received at Step S490. More specifically, the device controller 21 passes the SSID and the password contained in the Wi-Fi setting command to the second Wi-Fi communication unit 23 and then causes the second Wi-Fi communication unit 23 to connect to the access point 30 based on the SSID and the password, under the Wi-Fi specification. After that, the device controller 21 in the printer 20 concludes the process in the flowchart of FIG. 3.

At Step S300, the terminal controller 11 in the terminal apparatus 10 causes the first Wi-Fi communication unit 13 to start the second wireless communication via the access point 30 under the Wi-Fi specification, and then searches for the target printer 20. The process at Step S300 corresponds to that at a connection verification step which is subjected to the target printer 20. At Step S310, the terminal controller 11 causes the first touch panel display 14 to display the search result obtained at Step S300 on the screen. After that, the terminal controller 11 in the terminal apparatus 10 concludes the process in the flowchart of FIG. 2.

An SSID refers to one type of the name of an access point 30 on a wireless communication network. Both the terminal controller 11 and the device controller 21 recognize an SSID as an access point. Thus, the process in which the device searches for the SSID of an access point 30, for example, performed at Step S430 can be interpreted as a process in which the device searches for an access point 30. Likewise, the SSID list described above can be interpreted as the list of access points 30. Therefore, the SSID list is also referred below to as the "access point list".

Figure 6:
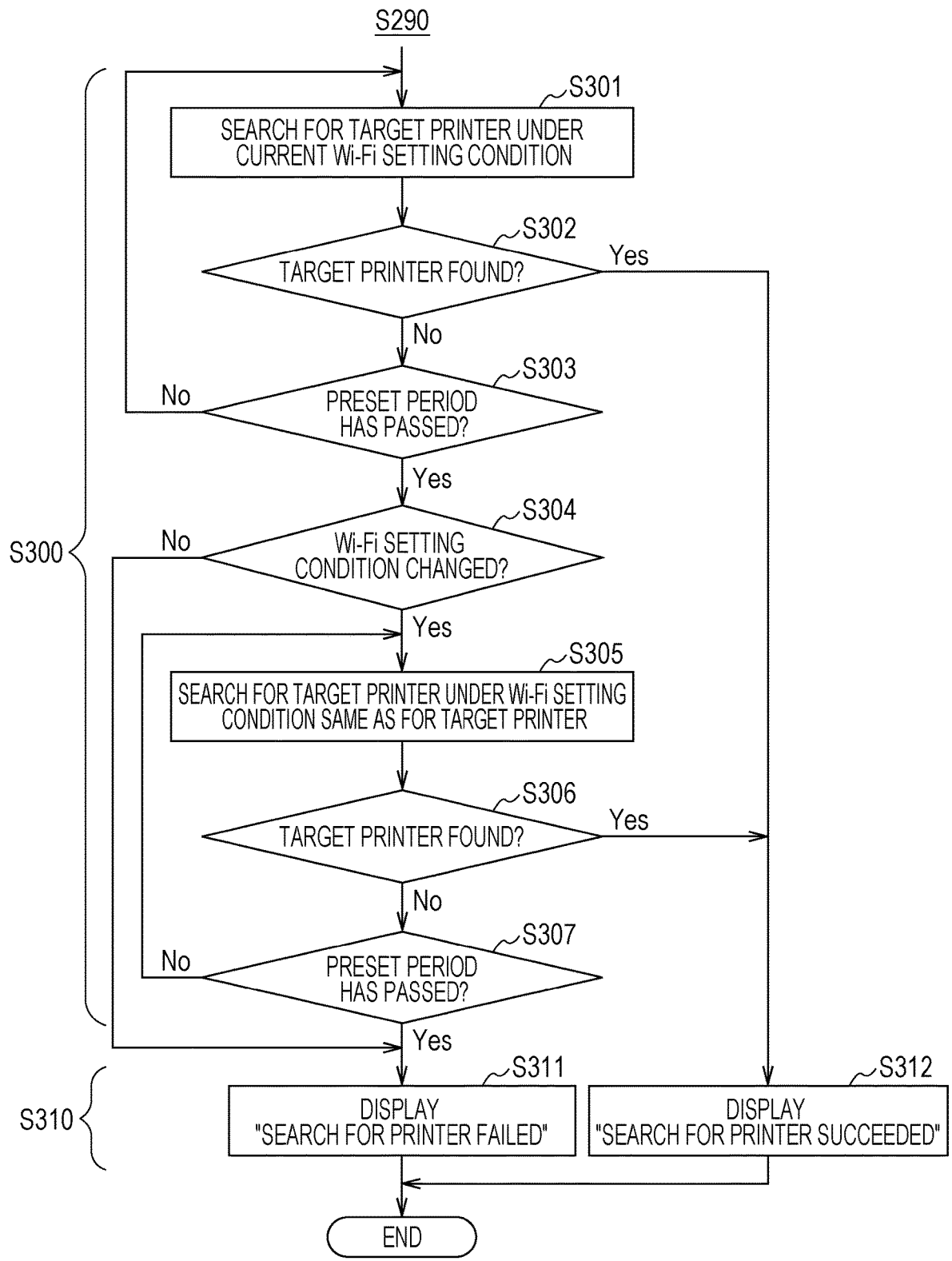
FIG. 6 is a flowchart of a detailed process at Steps S300 and S310 in FIG. 2.

FIG. 6 is a flowchart of a detailed process at Steps S300 and S310 in FIG. 2. At Step S301, which is the first sub-step in Step S300, the terminal controller 11 in the terminal apparatus 10 causes the first Wi-Fi communication unit 13 to search for the target printer 20 under a current Wi-Fi setting condition. In this case, the terminal controller 11 searches for a communication partner identified with the MAC address of the second Wi-Fi communication unit 23 in the target printer 20. The current Wi-Fi condition refers to a condition with the first SSID and the related password set to the first Wi-Fi communication unit 13. In short, the first access point is preset as a connection partner for the first Wi-Fi communication unit 13, and the first Wi-Fi communication unit 13 conducts the second wireless communication via the first access point and searches for the target printer 20.

Based on the result of the search process at Step S301, at Step S302, the terminal controller 11 determines whether the first Wi-Fi communication unit 13 has found the target printer 20. When the terminal controller 11 has found the target printer 20 (Yes at Step S302), the terminal controller 11 selects "Yes" and proceeds to the process at Step S312. When the terminal controller 11 has not found the target printer 20 (No at Step S302), the terminal controller 11 selects "No" and proceeds to the process at Step S303.

In the processes at Steps S100 to S290 in FIG. 2 and at Steps S400 to S500 in FIG. 3, for example, the second SSID is selected and set to the target printer 20. In this case, the first Wi-Fi communication unit 13 in the terminal apparatus 10 connects to the access point 30 based on the first SSID, whereas the second Wi-Fi communication unit 23 in the target printer 20 connects to the access point 30 based on the second SSID. In addition, the first SSID and the second SSID are possessed by the same access point 30 and indicate different supported frequency bands, such as those at 5.0 GHz and 2.4 GHz, respectively. When an access point 30 possesses a plurality of SSIDs indicating different supported frequency bands, this access point 30 relays data through wireless communications based on those SSIDs. If the second SSID and the password are normally set to the target printer 20, the terminal controller 11 can find the printer 20 in the search process at Step S301. If the first SSID is set to the target printer 20, both the first Wi-Fi communication unit 13 in the terminal apparatus 10 and the second Wi-Fi communication unit 23 in the printer 20 connect to the same access point 30 based on the first SSID. In this case, the terminal controller 11 can also find the target printer 20 in the search process at Step S301.

At Step S303, the terminal controller 11 determines whether a preset period has passed since the search process at the Step S301 in Step S300 started. When this period has passed (Yes at S303), the terminal controller 11 selects "Yes" and proceeds to the process at step S304. When the period has not yet passed (No at S303), the terminal controller 11 selects "No" and repeats the search process at Step S301 and the determination process at Step S302. Therefore, when having searched for the target printer 20 over the preset period at Step S301 but failing to find the target printer 20, the terminal controller 11 proceeds to the process at Step S304.

At Step S304, the terminal controller 11 determines whether to change the Wi-Fi setting condition for the first Wi-Fi communication unit 13. When it is necessary to make the change (Yes at S304), the terminal controller 11 selects "Yes" and proceeds to the process at Step S305. When it is unnecessary to make the change (No at S304), the terminal controller 11 selects "No" and proceeds to the process at Step S311. In this case, if the Wi-Fi setting conditions for the first Wi-Fi communication unit 13 in the terminal apparatus 10 and for the second Wi-Fi communication unit 23 in the target printer 20 coincide with each other, the terminal controller 11 may determine that it is unnecessary to make the change. If both the Wi-Fi setting conditions differ from each other, the terminal controller 11 may determine that it is necessary to make the change.

The Wi-Fi setting condition for the second Wi-Fi communication unit 23 in the target printer 20 corresponds to a condition with the SSID and the password contained in the Wi-Fi setting command that the terminal apparatus 10 has transmitted to the target printer 20 at Step S290. If the terminal apparatus 10 transmits the Wi-Fi setting command containing the first SSID and the related password to the target printer 20 at Step S290, the terminal controller 11 may select "No" in the determination process at Step S304. However, if the terminal apparatus 10 transmits the Wi-Fi setting command containing the first SSID and the related password to the printer 20 at Step S290, the terminal controller 11 is highly likely to find the target printer 20 in the determination process at Step S301. In other words, when the terminal controller 11 selects "Yes" at Step S303, the Wi-Fi setting conditions for the first Wi-Fi communication unit 13 in the terminal apparatus 10 and for the second Wi-Fi communication unit 23 in the target printer 20 are highly likely to differ from each other. Therefore, the terminal controller 11 does not necessarily have to perform the determination process at Step S304 in this embodiment and alternatively may proceed to the process at Step S305 if having selected "Yes" at Step S303.

At Step S305, the terminal controller 11 changes the Wi-Fi setting condition for the first Wi-Fi communication unit 13 so as to coincide with that for the second Wi-Fi communication unit 23 in the printer 20. Then, the terminal controller 11 causes the first Wi-Fi communication unit 13 to search for the target printer 20. In this case, the terminal controller 11 causes the first Wi-Fi communication unit 13 to search for a communication partner identified with the MAC address of the second Wi-Fi communication unit 23 in the target printer 20.

As described above, immediately after the determination process at Step S303 or S304, the Wi-Fi setting condition for the first Wi-Fi communication unit 13 may differ from that for the second Wi-Fi communication unit 23 in the target printer 20. Therefore, at Step S305, the terminal controller 11 needs to change the Wi-Fi setting condition for the first Wi-Fi communication unit 13. More specifically, the terminal controller 11 needs to change the connection partner for the first Wi-Fi communication unit 13 from the first access point to the access point 30 selected from the SSID list displayed at Step S220. Then, the terminal controller 11 causes the first Wi-Fi communication unit 13 to search for the target printer 20 via the selected access point 30. As a concrete example, if the user an SSID other than the second SSID from the SSID list and this SSID is set to the target printer 20, the terminal controller 11 performs the process at Step S305.

At Step S306, the terminal controller 11 determines whether the first Wi-Fi communication unit 13 has found the target printer 20 in the search process at Step S305. When the first Wi-Fi communication unit 13 finds the target printer 20 (Yes at S306), the terminal controller 11 selects "Yes" at Step S306 and proceeds to the process at Step S312. When the first Wi-Fi communication unit 13 fails to find the target printer 20 (No at S306), the terminal controller 11 selects "No" at Step S306 and proceeds to the process at Step S307.

At Step S307, the terminal controller 11 determines whether a preset period has passed since the search process at Step S305 in Step S300 started. When the preset period has passed (Yes at S307), the terminal controller 11 selects "Yes" and proceeds to the process at Step S311. When the preset period has not yet passed (No at S307), the terminal controller 11 selects "No" and repeats the search process at Step S305 and the determination process at Step S306. In other words, when the first Wi-Fi communication unit 13 searches for the target printer 20 at Step S305 over the above period but fails to find the target printer 20, the terminal controller 11 proceeds to the process at Step S311. The periods for the determination processes at Steps S303 and S307 may be in the range from several tens of seconds to several minutes, for example.

Depending on the result of the search process at Step S300 (Steps S301 to S307), the terminal controller 11 performs either one of the processes at Step S311 and S312 in Step S310. More specifically, at Step S311, the terminal controller 11 causes the first touch panel display 14 to display the message that the search for a printer failed. At Step S312, the terminal controller 11 causes the first touch panel display 14 to display the message that the search for a printer succeeded.

Figure 5C:
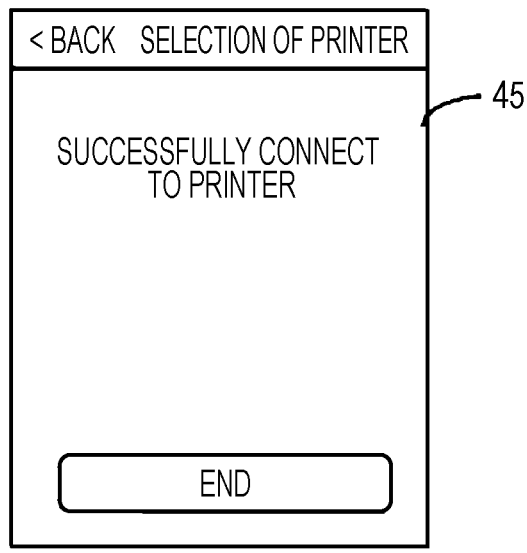
FIG. 5C illustrates a UI screen in the terminal apparatus.

FIG. 5C illustrates a UI screen 45, which is the UI screen displayed at Step S312 when the terminal controller 11 has found the target printer 20 at Step S300. If the terminal controller 11 has found the target printer 20 at Step S300, the terminal apparatus 10 can conduct the second wireless communication with the target printer 20 via the access point 30 under the Wi-Fi specification. In this case, for example, the terminal controller 11 causes the first touch panel display 14 to display the UI screen 45 containing the message that the connection between the terminal apparatus 10 and the target printer 20 is successfully established under the Wi-Fi specification.

Figure 5D:
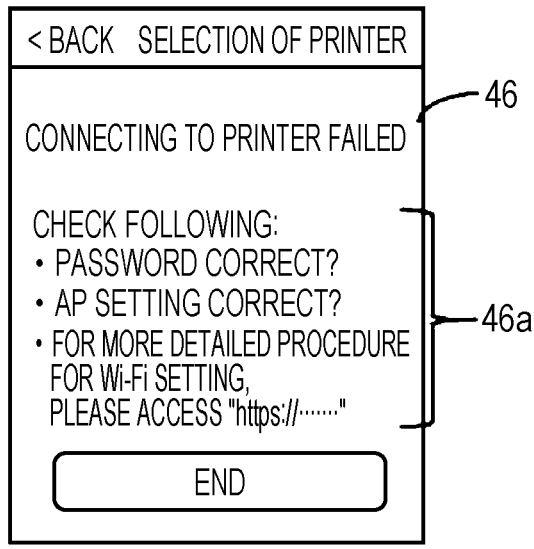
FIG. 5D illustrates a UI screen in the terminal apparatus.

FIG. 5D illustrates a UI screen 46, which is the UI screen displayed at Step S311 when the terminal controller 11 has failed to search for the target printer 20 at Step S300. If the terminal controller 11 searches for the target printer 20 at Step S300 but fails to find the target printer 20, the terminal apparatus 10 cannot conduct the second wireless communication with the target printer 20 via the access point 30 under the Wi-Fi specification. In this case, for example, the terminal controller 11 causes the first touch panel display 14 to display the UI screen 46 containing a message that the connection between the terminal apparatus 10 and the target printer 20 cannot be established under the Wi-Fi specification.

At Step S311, the terminal controller 11 may also cause the first touch panel display 14 to display the UI screen 46 containing a message 46a that suggests a possible reason why the terminal apparatus 10 cannot connect to the target printer 20 via the access point 30, for example, as illustrated in FIG. 5D. In this case, for example, the message 46a may be an inquiry of the user whether he or she by mistake input wrong password into the UI screen 44 or set the access point 30 improperly. In addition, for example, the message 46a may contain the URL of a web page describing detailed procedures for the Wi-Fi setting condition of a printer 20. Displaying the UI screen 46 with the message 46a can appropriately support a user who cannot establish the Wi-Fi setting condition for a printer 20.

When the first BLE communication unit 12 in the terminal apparatus 10 conducts the first wireless communication with the second BLE communication unit 22 in the printer 20 through the BLE connection, data in a format conforming to a general-purpose network management protocol may be exchanged therebetween. More specifically, the terminal controller 11 may generate a packet that contains data in a format conforming to a simple network management protocol (SNMP), as data to be transmitted to the printer 20 at Steps S170, S200, S240, and S290, for example. Then, the terminal controller 11 may cause the first BLE communication unit 12 to suitably convert the generated packet into data in a format that supports the first wireless communication and may cause the first BLE communication unit 12 to transmit the data to the second BLE communication unit 22 in the printer 20. Likewise, the device controller 21 may generate a packet that contains data in a format conforming to the SNMP, as data to be transmitted to the terminal apparatus 10 at Steps S440, S460, and S480, for example. Then, the device controller 21 may cause the second BLE communication unit 22 to suitably convert the generated packet into data in a format that supports the first wireless communication and may cause the second BLE communication unit 22 to transmit the data to the first BLE communication unit 12 in the terminal apparatus 10.

According to the above embodiment, the terminal apparatus 10 includes a first wireless communication unit, a second wireless communication unit, and a terminal controller 11. The first wireless communication unit conducts first wireless communication with a device under a first wireless communication scheme. The second wireless communication unit conducts second wireless communication via an access point 30 that supports a second wireless communication scheme. The terminal controller 11 causes a predetermined display unit to display an access point list (SSID list) that the first wireless communication unit receives from the device. The device acquires the access point list by searching for access points 30 that support the second wireless communication scheme. The terminal controller 11 connects the device to an access point 30 selected from the access point list under the second wireless communication scheme. The terminal controller 11 designates the access point 30 selected from the access point list as an access point 30 to which the second wireless communication unit is to connect and causes the second wireless communication unit to search for the device via the access point 30 selected from the access point list.

According to the above configuration, the terminal apparatus 10 designates the access point 30 selected from the access point list as the access point 30 to which the second wireless communication unit is to connect. In other words, the terminal apparatus 10 designates the access point 30 set to the device such that the device connects to the access point 30 under the second wireless communication scheme, as the access point 30 to which the second wireless communication unit is to connect. As a result, when the first Wi-Fi communication unit 13 in the terminal apparatus 10, which serves as the second wireless communication unit, is highly likely to find the device via the access point 30. Even if a user selects an SSID other than a second SSID from the access point list, the terminal apparatus 10 can verify the connection to the device via the access point 30.

According to the embodiment, when a first access point that differs from the access point 30 selected from the access point list is predesignated as the access point 30 to which the second wireless communication unit is to connect, the terminal controller 11 may cause the second wireless communication unit to search for the device via the first access point (at Step S301). When the second wireless communication unit searches for the device via the first access point but fails to find the device ("No" at Step S302), the terminal controller 11 may set the access point 30 selected from the access point list to the second wireless communication unit and may cause the second wireless communication unit to search for the device via the access point 30 selected from the access point list (at Step S305).

According to the above configuration, the terminal controller 11 first causes the first Wi-Fi communication unit 13, which serves as the second wireless communication unit, to search for the device via the first access point. Then, when the first Wi-Fi communication unit 13 fails to find the device, the terminal controller 11 causes the first Wi-Fi communication unit 13 to search for the device via the access point 30 selected from the access point list. As a result, the terminal apparatus 10 can verify the connection to the device via the access point 30 in the following cases: a case where the first access point is designated as the access point 30 to which the target printer 20 is to connect; a case where the second SSID is selected from the access point list; and a case where an SSID other than the second SSID is selected from access point list. In this embodiment, the terminal controller 11 may skip the process at Steps S301 to S304 in Step S300 illustrated in FIG. 6 and starts with the process at Step S305 in Step S300. As an example, if the access point 30 to which the second wireless communication unit is to connect is not set when the terminal controller 11 performs the process at Step S300, the terminal controller 11 may start with the process at Step S305 in Step S300.

According to the embodiment, the first wireless communication that the first wireless communication unit conducts with the device may be direct communication that involves no relay apparatus. In the above description, the first wireless communication unit may conduct the first wireless communication under a wireless communication scheme conforming to the BLE specification. However, the first wireless communication unit may also conduct the first wireless communication under a direct, wireless communication scheme conforming to any other specifications, including Bluetooth and infrared wireless communication specifications.

3. Other Embodiments

The foregoing embodiment is not intended to limit the present disclosure and may be modified in various ways as described below. As one modification, in response to the termination of the application 11*a* that utilizes the function of the device through the second wireless communication, the terminal controller 11 may return the access point 30 set to the second wireless communication unit, from the access point 30 selected from the access point list to the first access point.

The application 11*a* is preinstalled in the terminal apparatus 10 so that the terminal apparatus 10 can utilize the function of the printer 20. In one embodiment, the terminal apparatus 10 performs "the wireless connection control process" described above in accordance with the application 11*a* in order to utilize the function of the printer 20. In this process, the terminal apparatus 10 searches for the target printer 20 at Step S300 and conducts the second wireless communication via an access point 30. During this communication, the terminal apparatus 10 transmits print data to the printer 20, and the target printer 20 receives and prints the print data, in accordance with the application 11*a*. After that, for example, the terminal apparatus 10 terminates the application 11*a* automatically or in response to user's operation.

Figure 7:
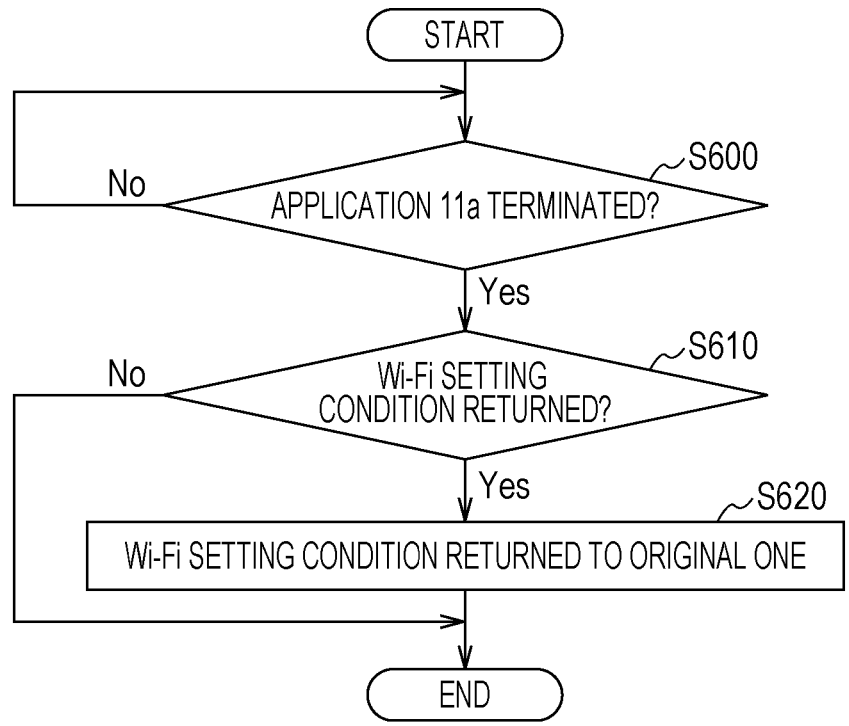
FIG. 7 is a flowchart of a process of terminating an application.

FIG. 7 is a flowchart of a process of terminating the application 11*a*. When the application 11*a* is activated, the terminal controller 11 determines whether to terminate the application 11*a* at any given timing (at Step S600). When determining the termination of the application 11*a* (Yes at Step S600), the terminal controller 11 selects "Yes" and proceeds the process at Step S610.

At Step S610, the terminal controller 11 determines whether it is necessary to return the Wi-Fi setting condition for the first Wi-Fi communication unit 13 to the original one. When determining that it is necessary to return the Wi-Fi setting condition (Yes at S610), the terminal controller 11 selects "Yes" and proceeds to the process at Step S620. When determining that it is unnecessary to return the Wi-Fi setting condition (No at S610), the terminal controller 11 selects "No" and concludes the process of the flowchart of FIG. 7. The "original Wi-Fi setting condition" for the first Wi-Fi communication unit 13 corresponds to a setting condition with the first SSID and related password. If the Wi-Fi setting condition for the first Wi-Fi communication unit 13 is unchanged from the start to Step S610, the terminal controller 11 selects "No" at Step S610. If the Wi-Fi setting condition for the first Wi-Fi communication unit 13 is changed from the start to Step S610, the terminal controller 11 selects "Yes" at Step S610. As can be understood from the above description, the terminal controller 11 selects "Yes" at Step S610 if having performed the process at Step S305 in Step S300.

At Step S620, the terminal controller 11 returns the Wi-Fi setting condition for the first Wi-Fi communication unit 13 to the original one, and then concludes the process of the flowchart of FIG. 7. As the result of the process at Step S620, the Wi-Fi setting condition for the first Wi-Fi communication unit 13 is returned from the setting condition related to the selected SSID, namely, the setting condition with the selected SSID and the password contained in the Wi-Fi setting command that the terminal apparatus 10 has transmitted to the target printer 20 at Step S290 to the original one. After having selected "Yes" at Step S600, the terminal controller 11 may perform the process at Step S610 or the processes at Steps S610 and S620 and then may terminate the application 11*a*. Alternatively, the terminal controller 11 may terminate the application 11*a* before performing the process at Step S610 or the processes at Steps S610 and S620.

According to the above configuration, in response to the termination of the application 11*a*, the terminal controller 11 can return the connection setting of the first Wi-Fi communication unit 13 to the original setting. Therefore, even if the first Wi-Fi communication unit 13, which serves as the second wireless communication unit, is temporarily connected to the access point 30 selected from the access point list in accordance with the execution of the application 11*a*, the first Wi-Fi communication unit 13 is re-connected to the first access point in response to the termination of the application 11*a*. As a result, the terminal controller 11 suppresses the second wireless communication unit from being connected to an access point 30 other than the first access point even after the application 11*a* has been terminated. This configuration can be convenient for a user.

In one embodiment, when searching for the device via the access point 30 selected from the access point list but failing to find the device, the terminal controller 11 accepts the selection of another access point 30 other than the access point 30 selected from the access point list.

Figure 8:
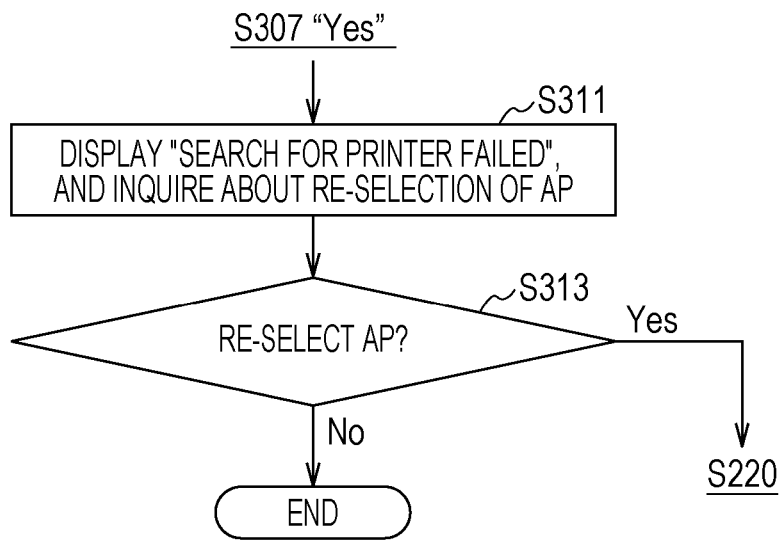
FIG. 8 is a flowchart of a process of inquiring whether to re-select an access point.

FIG. 8 is a flowchart of a process of inquiring whether to re-select an access point. As already described above, when selecting "Yes" at Step S307, the terminal controller 11 causes the first touch panel display 14 to display the message that the search for the target printer 20 failed, at Step S311. At Step S311, however, the terminal controller 11 may inquire of the user whether to re-select an access point 30 in addition to displaying the message. More specifically, the terminal controller 11 may cause the second touch panel display 24 to display the UI screen 46, as illustrated in FIG. 5D, containing, for example, a message that inquires of the user whether to re-select an access point 30 and an instruction button.

When seeing the UI screen 46 at Step S311, the user inputs the answer to the inquiry through the first touch panel display 14. When accepting an instruction of re-selecting an access point 30, the terminal controller 11 selects "Yes" at Step S313 and returns to the process at Step S220. When accepting an instruction of not re-selecting an access point 30, the terminal controller 11 selects "No" at Step S313 and concludes the process of the flowchart of FIG. 2.

After Step S313, the terminal controller 11 repeats the processes at Step S220 and the subsequent steps in the above-described manner. At Step S220 following Step S313, namely, in the second process at Step S220, the user who sees the SSID list selects an SSID different from the SSID that has been selected in the first process at Step S220. In the second process at Step S230, the terminal controller 11 accepts an access point 30 different from the access point 30 that has been selected in the first process as Step S230. As an example, if an SSID other than the second SSID is selected in the first process at Step S230, the second SSID may be selected in the second or subsequent process at Step S230.

As described above, if searching for the target printer 20 via an access point 30 selected from the access point list but failing to find the target printer 20, the terminal controller 11 repeatedly accepts the selection of another access point 30 from the access point list. In this way, the terminal apparatus 10 is more likely to verify the connection to the target printer 20 via an access point 30. It should be noted that the "current Wi-Fi setting condition" in the second or subsequent process at Step S301 in Step S300 refers to the original Wi-Fi setting condition. Therefore, before performing the process at Step S301, the terminal controller 11 returns the Wi-Fi setting condition for the first Wi-Fi communication unit 13 to the original one as appropriate.

A device that a terminal apparatus 10 subjects to a wireless connection control process is not limited to a multi-function printer (MFP) or a printer. Alternatively, the device may be a scanner unit, a facsimile unit, a projector, or other product.

What is claimed is:

1. A terminal apparatus comprising:
   a first wireless communication device that conducts first wireless communication with a device under a first wireless communication scheme;
   a second wireless communication device that conducts second wireless communication via an access point, the access point supporting a second wireless communication scheme; and
   a controller implemented in a CPU that causes a predetermined display device to display an access point list that the first wireless communication device receives from the device, the device acquiring the access point list by searching for access points that support the second wireless communication scheme,
   the controller connecting the device to an access point selected from the access point list under the second wireless communication scheme,
   the controller designating the access point selected from the access point list as an access point to which the second wireless communication device is to connect,
   the controller causing the second wireless communication device to search for the device via the access point selected from the access point list,
   wherein when a first access point that differs from the access point selected from the access point list is predesignated as the access point to which the second wireless communication unit is to connect, the controller causes the second wireless communication device to search for the device via the first access point,
   wherein when the second wireless communication unit searches for the device via the first access point but fails to find the device, the controller sets the access point selected from the access point list to the second wireless communication device, and causes the second wireless communication unit to search for the device via the access point selected from the access point list, and
   wherein in response to termination of an application that utilizes a function of the device through the second wireless communication scheme, the controller returns the access point set to the second wireless communication device, from the access point selected from the access point list to the first access point.

2. The terminal apparatus according to claim 1, wherein when searching for the device via the access point selected from the access point list but failing to find the device, the controller accepts a selection of another access point other than the access point selected from the access point list.

3. The terminal apparatus according to claim 1, wherein the first wireless communication that the first wireless communication device conducts with the device is direct communication that involves no relay apparatus.

4. A wireless connection control method comprising:
   a reception step of receiving an access point list from a device through first wireless communication conducted under a first wireless communication scheme, the device acquiring the access point list by searching for access points that support a second wireless communication scheme;
   a display step of displaying the access point list in a predetermined display unit;
   a connection control step of connecting the device to an access point selected from the access point list under the second wireless communication scheme; and
   a connection verification step of designating the access point selected from the access point list as an access point to which a second wireless communication device is to connect, the second wireless communication device configured to conduct the second wireless communication via an access point, the access point supporting the second wireless communication scheme, and of causing the second wireless communication device to search for the device via the access point selected from the access point list,
   wherein when a first access point that differs from the access point selected from the access point list is predesignated as the access point to which the second wireless communication unit is to connect, the second wireless communication device is caused to search for the device via the first access point,
   wherein when the second wireless communication unit searches for the device via the first access point but fails to find the device, the access point selected from the access point list is set to the second wireless communication device, and the second wireless communication unit is caused to search for the device via the access point selected from the access point list, and
   wherein in response to termination of an application that utilizes a function of the device through the second wireless communication scheme, the access point set is returned to the second wireless communication device, from the access point selected from the access point list to the first access point.

5. A non-transitory computer-readable storage medium storing a wireless connection control program, the wireless connection control program comprising:
   a reception function of receiving an access point list from a device through first wireless communication conducted under a first wireless communication scheme, the device acquiring the access point list by searching for access points that support a second wireless communication scheme;
   a display function of displaying the access point list in a predetermined display unit;
   a connection control function of connecting the device to an access point selected from the access point list under the second wireless communication scheme; and
   a connection verification function of designating the access point selected from the access point list as an access point to which a second wireless communication unit is to connect, the second wireless communication unit configured to conduct the second wireless communication via an access point, the access point supporting the second wireless communication scheme, and of causing the second wireless communication unit to search for the device via the access point selected from the access point list,
   wherein when a first access point that differs from the access point selected from the access point list is predesignated as the access point to which the second wireless communication unit is to connect, the second wireless communication device is caused to search for the device via the first access point,
   wherein when the second wireless communication unit searches for the device via the first access point but fails to find the device, the access point selected from the access point list is set to the second wireless communication device, and the second wireless communication unit is caused to search for the device via the access point selected from the access point list, and wherein in response to termination of an application that utilizes a function of the device through the second wireless communication scheme, the access point set is returned to the second wireless communication device, from the access point selected from the access point list to the first access point.

\* \* \* \* \*